United States Patent [19]

Wimpee et al.

[11] Patent Number: 4,634,568
[45] Date of Patent: Jan. 6, 1987

[54] FIXED INCORE WIDE RANGE NEUTRON SENSOR

[75] Inventors: Lealon C. Wimpee; John P. Sturtz; John P. Neissel, all of San Jose, Calif.

[73] Assignee: General Electric Company, San Jose, Calif.

[21] Appl. No.: 543,464

[22] Filed: Oct. 19, 1983

[51] Int. Cl.⁴ ............................................. G21C 17/00
[52] U.S. Cl. ..................................... 376/154; 376/254; 376/255; 250/392
[58] Field of Search ....................... 376/154, 254, 255; 250/390–392

[56] References Cited

U.S. PATENT DOCUMENTS

| | | | |
|---|---|---|---|
| 3,043,954 | 7/1962 | Boyd et al. | 376/153 |
| 3,565,760 | 2/1971 | Parkos et al. | 376/254 |
| 3,579,127 | 5/1971 | Thomas | 250/392 |
| 3,780,292 | 12/1973 | Klar | 376/255 |
| 4,103,166 | 7/1978 | Niessel et al. | 250/391 |
| 4,121,106 | 10/1978 | Terhune et al. | 250/390 |
| 4,235,670 | 10/1980 | Alzgidi | 376/255 |
| 4,318,776 | 3/1982 | Proll et al. | 376/254 |
| 4,404,164 | 9/1983 | Kopp et al. | 376/255 |

FOREIGN PATENT DOCUMENTS

| | | |
|---|---|---|
| 1160957 | 1/1964 | Fed. Rep. of Germany . |
| 2516977 | 10/1975 | Fed. Rep. of Germany . |
| 3042667 | 6/1981 | Fed. Rep. of Germany . |
| 1596082 | 6/1970 | France . |

OTHER PUBLICATIONS

B. B. Rossi, H. H. Staub, "Ionization Chambers and Counters", New York, 1949, McGraw-Hill Book Company, pp. 203–219.

Primary Examiner—Salvatore Cangialosi
Attorney, Agent, or Firm—Ivor J. James, Jr.; Raymond G. Simkins

[57] ABSTRACT

Disclosed is a neutron detector, provided with a sealed chamber having two spaced-apart electrodes, hermetically sealed in the chamber with a seal which is located in an environment of at least two decades less neutron flux than that experienced by the detector. An ionizable gas is placed within the space between the electrodes, and pressurized to a pressure above one atmosphere. A layer of a mixture of an active material and a breeding material are positioned within the chamber, the active material and breeding material being respectively U-235 and U-234, which layer has a thickness of at least 0.2 milligrams per square centimeter.

36 Claims, 7 Drawing Figures

FIXED INCORE WIDE RANGE NEUTRON SENSOR

BACKGROUND OF THE INVENTION

The field of the present invention is directed in general to an ion chamber-type neutron detector, and more particularly to extended life and improved sensitivity of such detectors when used to measure the neutron flux in a nuclear reactor core.

An example of an incore neutron detector system of the type which the present invention may be employed is shown by G. R. Parkos et al. in U.S. Pat. No. 3,565,760, entitled "Nuclear Reactor Power Monitor System", which patent is hereby incorporated by reference.

Ion chamber type neutron detectors are well known and are shown for example in U.S. Pat. No. 3,043,954 by L. R. Boyd et al., entitled "Fission Chamber Assembly", which patent is hereby incorporated by reference. Usually such chambers comprise a pair of spaced electrodes electrically insulated from one another, with a neutron sensitive material and an ionizable gas therebetween. For example, in a fission type ion chamber, the neutron sensitive material is a material such as uranium 235 which is fissionable by thermal neutrons. As neutrons induce fissions of the uranium in the chamber, the resultant fission products ionize the gas in proportion to the magnitude of the neutron flux in the chamber. When a direct current voltage is applied across the electrodes, an output signal is created which is proportional to the amount of ionization and hence proportional to the neutron flux in the chamber.

Since the early days of nuclear fission reactors, neutron sensitive ion chambers have been used for control of Light Water Reactors (LWR) during startup as well as full power operation. The Power Range Monitors (PRM) for sensing neutron fluxes in LWR's operating at full power have typically been miniature fixed incore fission chambers. Full power operation is generally defined as operation of the LWR at 100% of its designed full power rating.

However, the ion chambers used for measuring the neutron flux during initial startup (i.e. the Source Range Monitors, abbreviated SRM, and the Intermediate Range Monitors, abbreviated IRM) of the LWR have not been fixed in the core of the reactor. Typically, the startup sensors include four source range monitors (SRM) which cover the neutron flux range from $10^3$ to $10^9$ nv, and eight intermediate range monitors (IRM) which can cover the range from $10^8$ to $1.5 \times 10^{13}$ nv. The common unit of flux is defined as the number of particles crossing a unit area per unit time, and is a measure of intensity. For this discussion, the neutron flux is indicated by the symbol "nv", which denotes the number of neutrons which pass through an area of one square centimeter in one second. Together, these sensors and associated electronics cover greater than ten decades of neutron flux.

Figure 1:
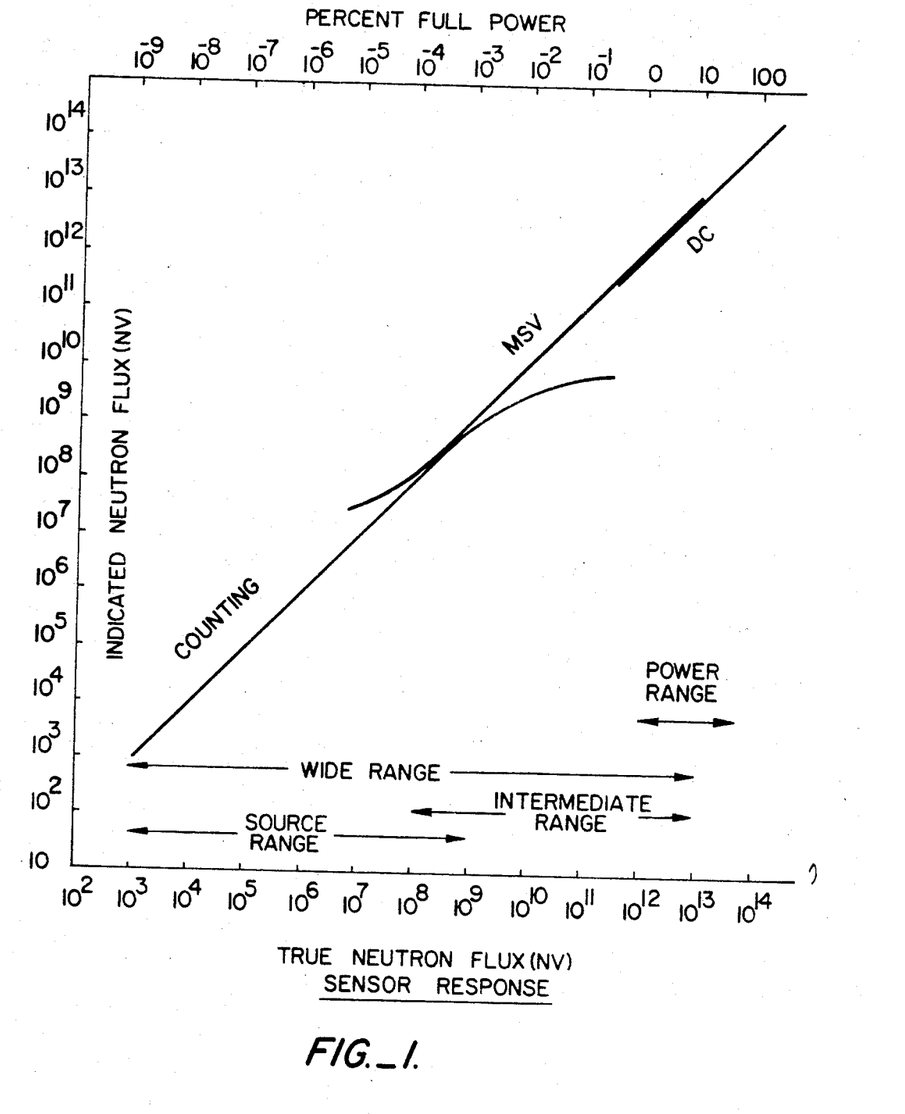
FIG. 1 is a graph of various sensor or detector responses to various levels of neutron flux, with the "WIDE RANGE" label indicating the range of response of the detector according to this invention.

FIG. 1 is a graphical representation of the source range, intermediate range, and power range operation of a BWR, and the various responses of the three different sensors to various levels of neutron flux.

Because of the need for high sensitivity in the source range and intermediate range, and in order to prevent premature burnup of the SRMs and IRMs during full power operation of the LWR, the SRM and IRM sensors have heretofore been retracted to a position below the BWR core where the neutron flux is negligible. The system for inserting and retracting the sensors consists of drive control electronics, drive motors, flexible drive shafts, gear boxes, and vertical drive tubes which contain the sensors and provide a means for inserting them into a hollow cylindrical dry tube fixed in and extending into the core of the BWR. These components require a high level of maintenance, are subject to damage during control rod drive maintenance, and add to under-vessel clutter.

Another problem associated with the high level of maintenance required for the retractable detectors is that human beings are exposed to radiation. As is known, the Nuclear Regulatory Commission (NRC) sets an upper maximum of radiation to which a human being can be exposed for a given period of time, typically referred to as the man-rem exposure.

Additionally, the NRC has published a new regulation in Regulatory Guide 1.97, requiring operating plants to have a safety related system to monitor neutron flux levels after a loss-of-coolant accident (LOCA) from a power range of $10^{-6}$ percent all the way up to 100% of full power.

Therefore, a need exists for a sensor which (1) can be fixed in the reactor core without rapid burnup, (2) can remain in the reactor core for three or more operating cycles or approximately 5 full power years in a BWR, and (3) operates over a wide range of neutron fluxes preferably with the use of one sensor in place of the presently used two sensors.

SUMMARY OF THE INVENTION

The present invention provides a wide range neutron detector. A sealed chamber, having two spaced electrodes positioned therein, is hermetically sealed with a seal which is disposed in an environment having neutron flux which is substantially at least two decades below the neutron flux at the location of the detector. An ionizable gas is disposed within the space between the electrodes, and pressurized to a pressure above six atmospheres. A layer of a mixture of an active material and a breeding material is positioned within the chamber, with the active material and breeding material being respectively U-235 and U-234. The layer has a thickness of at least 0.2 milligrams per square centimeter.

BRIEF DESCRIPTION OF THE DRAWINGS

The accompanying drawings, which are incorporated into and form a part of the invention specification, illustrate an example embodiment of the invention. The drawings serve to explain by example the principles of the invention when read together with the example construction and operation of the invention according to the embodiments provided in the Detailed Description of the Preferred Embodiments, discussed below.

In the drawings.

DETAILED DESCRIPTION OF THE PREFERRED EMBODIMENTS

FIG. 1 was previously discussed in the section entitled "Background of the invention", so will not be further discussed here.

Figure 2:
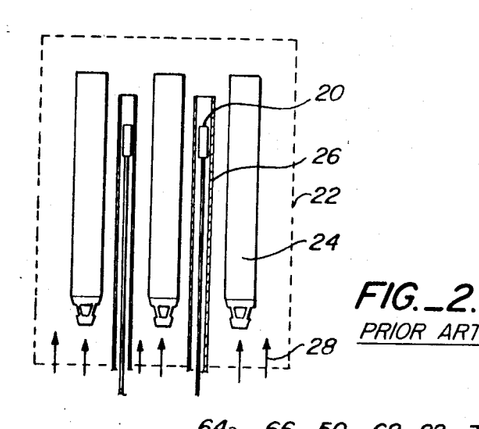
FIG. 2 is a schematic illustration of a neutron detector in a reactor core.

FIG. 2 schematically illustrates a plurality of detectors 20, positioned in a nuclear reactor 22 to monitor the neutron flux therein. As is well known. such a core comprises a plurality of spaced fuel assemblies 24, each containing a plurality of fuel elements or fuel rods containing a fissionable material such as U-235. Protective tubes 26 are positioned in spaces between the fuel assemblies 24 to receive detectors 20. The tubes 26 may be sealed, or may be open as shown to receive the flow of coolant flowing around the detectors 20. In practice, a number of power range detectors 20 are distributed in a predetermined arrangement in the nuclear reactor core, including several detectors 20 at different core elevations in each tube 26, to provide an accurate indication of the magnitude and distribution of the neutron flux in the core. Such a system is shown and described in fuller detail in U.S. Pat. No. 3,565,760, which is hereby incorporated by reference. The Wide Range Neutron Monitors (WRNM) of the present invention will be positioned approximately 1.5 feet above the core center plane.

Figure 3:
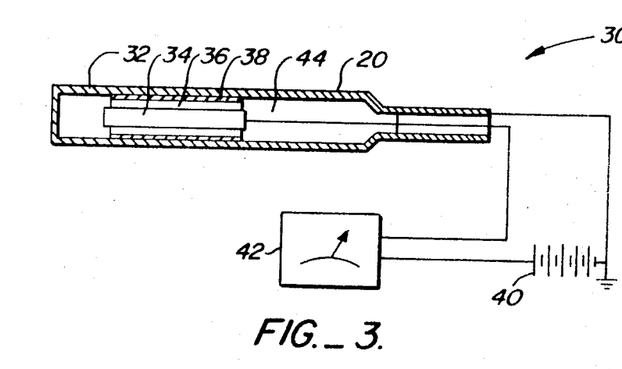
FIG. 3 is a schematic illustration of a neutron detector and a circuit connected thereto.

FIG. 3 is a schematic illustration of a neutron detector 20 for use in a neutron detection system 30 in accordance with the invention. The detector 20 includes two spaced concentric electrodes, first electrode 32 and second electrode 34. The space 36 between the electrodes 32 and 34 is sealed and filled with a pressurized ionizable gas, for example a noble gas such as argon. Carried on the surface on one or both of the electrodes 32 and 34 is a layer of a mixture of active and breeding materials, one of which can be activated by neutrons, for example fissionable uranium.

In the presence of a neutron flux, this mixture or coating 38 of fissionable material undergoes fission reactions at a rate proportional to the neutron flux. The resulting fission products cause ionization of the gas in space 36 in proportion with the number of fissions. A power supply 40 of appropriate voltage connected between electrodes 32 and 34 results in collection of ion pairs by electrodes 32 and 34. This results in current flowing from first electrode 32 to second electrode 34 and onto an electrical detector system such as meter 42. The signal indicated by meter 42 is proportional to the neutron flux in the chamber 44 of detector 20. The life span of the detector 20 is dependent on the rate of depletion of the active and breeding materials, and therefore is dependent on the thermal and epithermal components of neutron flux in the chamber.

Figure 4:
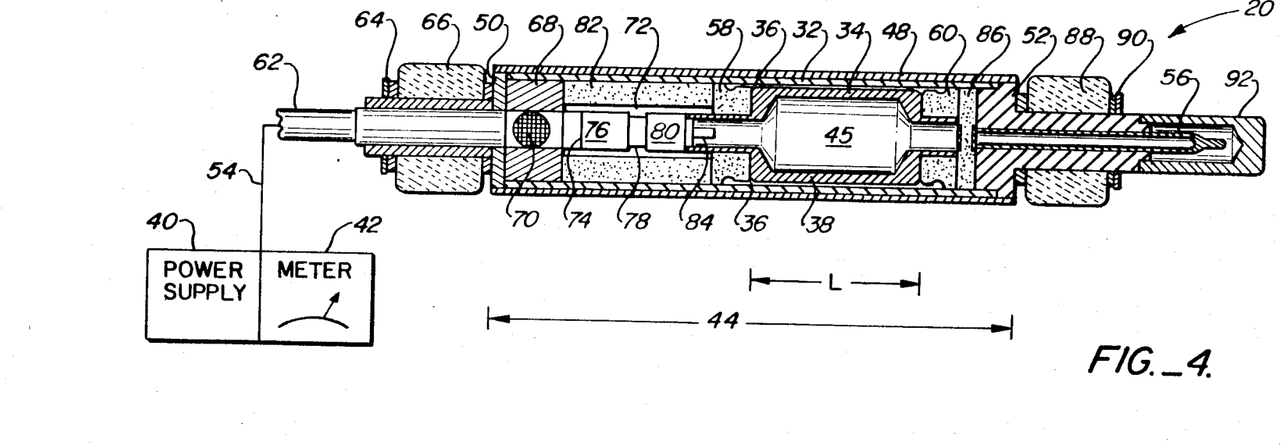
FIG. 4 illustrates the neutron detector according to this invention.

FIG. 4 is a specific embodiment according to the invention. The neutron detector 20 comprises a sealed chamber 44 containing two spaced apart electrodes, the first electrode 32 and second electrode 34. The sealed chamber 44 comprises a length of stainless steel tubing 48, sealed by first end plug 50 and second end plug 52. End plug 50 includes a passageway for passing an electrical conductor 54 therethrough. The electrodes 32 and 34 are maintained in insulated relationship with respect to one another by ceramic insulating first spacer 58 and second spacer 60. The center or interior electrode 34 serves as the anode, and is electrically connected through electrical conductor 54 to power supply 40 and signal processing electronics. An ionizable gas such as argon or helium is disposed in the space 36 between electrodes 32 and 34.

In order for detector 20 to have the sensitivity desired over the ten decade range of measurement of neutron fluxes, it is particularly important that space 36 be maintained at a high pressure above 2 atmospheres of pressure. This feature is an important distinction of this invention over U.S. Pat No. 4,121,106 discussed above. A suitable range of pressures of the gas held in space 36 range from 2 atmospheres to 20 atmospheres, and preferably is maintained at approximately 14.7 atmospheres pressure. Preferably anode 32 is provided with an interior hollow 45 as shown in FIG. 4, which hollow 45 is filled with the same ionizable gas used in space 36 and is in communication with space 36. In hollow 45 the ionizable gas serves as a gas compensating volume. Hollow 45 is pressurized to the same pressure as space 36. This arrangement is preferred because the gas compensating volume serves to significantly improve detector linearity and to reduce gamma heating because the mass of anode 34 is reduced.

A thin coating 38 of a mixture of active and breeding material is located on the surface of anode 34. In other embodiments of the invention, the inside diameter of the cathode 32 may carry the thin coating 38, or both the cathode 32 and the anode 34 may include a film of the mixture of active and breeding materials. In the present case, coating 38 is made up of a ratio ranging from 70:30 to 90:10 of a mixture of U-234 and U-235 respectively, which is deposited on the outside diameter of anode 34. In the preferred embodiment, a 79:21 mixture of U-234 and U-235 respectively is used, thus providing a sensitivity versus neutron exposure relation which is well documented based on performance of power range detectors using the same mixture.

This mixture results in approximately a 60% reduction in sensitivity of the detector 20 after five full years of operation in a reactor core operating at full power. If the target sensitivity of detector 20 at the end of five full power years is for example $1 \times 10^{-3}$ counts per second/nv, (which will provide a much higher count rate, than required by plant technical specifications as determined by the plant manufacturer) then an initial sensitivity of $2.5 \times 10^{-3}$ counts per second/nv will permit fixed incore positioning. It will thus desirably eliminate the presently used SRM and IRM drive components.

Continuing with the FIG. 4 construction, conductor 54 is housed in cable 62 having a length of approximately 40 feet. Cable 62 penetrates retaining ring 64 attached to housing insulator 66, which in turn is mounted on end plug 50 and welded in place on the housing of detector 20. Inside detector 20, abutting the inside face of end plug 50, is cable adaptor 68. Screen 70, a porous steel membrane, is provided to permit gas movement from sensor to cable, all the way down to the ceramic seal, discussed below. The function of housing insulator 66 is to insulate the sensor from the tube into which it is installed. Inside the detector 20, conductor 54 resides in an insulated sealed conduit 72 spanning the distance between cable adaptor 68 and first spacer 58.

In conduit 72 the cable 62 is connected at joint 74 to a first unit 76, a second unit 78, and a third unit 80. Units 76, 78, 80 are components of a ceramic-to-metal seal used for terminating the cable with a rigid electrical insulating assembly.

At the opposite end of electrode 34 (i.e. toward the right side of FIG. 4), outside the second spacer 60 is positioned the disk insulator 86, followed by the previously mentioned second end plug 52 which is welded in place to housing 48. Outside detector 20, attached to the exterior surface of end plug 52, is housing insulator 88, followed by retaining ring 90. Housing insulator 88 and retaining ring 90 are substantially identical in function and structure to insulator 66 and retaining ring 64. Hollow cap 92 is attached to end plug 52.

A pumpout tube 56 is affixed in fluid communication with internal spaces of the detector including hollow 45, space 36, and via filter 70 with the interior space of the cable 62. Pumpout tube 56 is used to evacuate hollow 45, space 36 and cable 62, and then backfill hollow 45, space 36 and cable 62 with the gas mixture and pressure desired.

The electric current generated by detector 20 in response to a neutron pulse is routed through conductor 54 to meter 42 for analysis. This meter 42 can take many different forms of electrical analytical circuits, several of which are known in the art. An example is U.S. Pat. No. 3,579,127 to Thomas entitled "Apparatus for Monitoring Pulses"; this patent is hereby incorporated by reference to this specification. That patent provides electrical circuitry which operates to produce an output signal proportional to the log of the average rate of the random pulses measured by detector. The pulse signal rate varies over total pulse rate range of sufficient magnitude as to require at least two different monitoring techniques.

In U.S. Pat. No. 3,579,127, a first intermediate signal is produced which is proportional to the log of the pulse rate of the random pulses and a predetermined lower portion of the total pulse rate range. The first and second intermediate signals are adjustable so as to bear the same proportional relation to the log of the average pulse rate. The amplitudes and the levels at which the two intermediate signals can be limited and combined are also adjustable. A combining or summing output circuit is provided to produce a single output from both the first and second intermediate signals, so that the output signal is thereby a linear, continuous signal which is proportional to the log of the average pulse rate over the entire pulse rate range.

Another example of prior art circuitry is provided in U.S. Pat. No. 4,103,166 to Neissel, Green, and Dayal entitled "Method and Apparatus for Monitoring the Output of a Neutron Detector"; this patent is hereby incorporated by reference into the specification. According to that patent, a voltage proportional to the mean-square alternating current in the fission chamber of a detector, normally called the AC signal, is formed, and is a measure of the neutron flux in the intermediate range.

Figure 5:
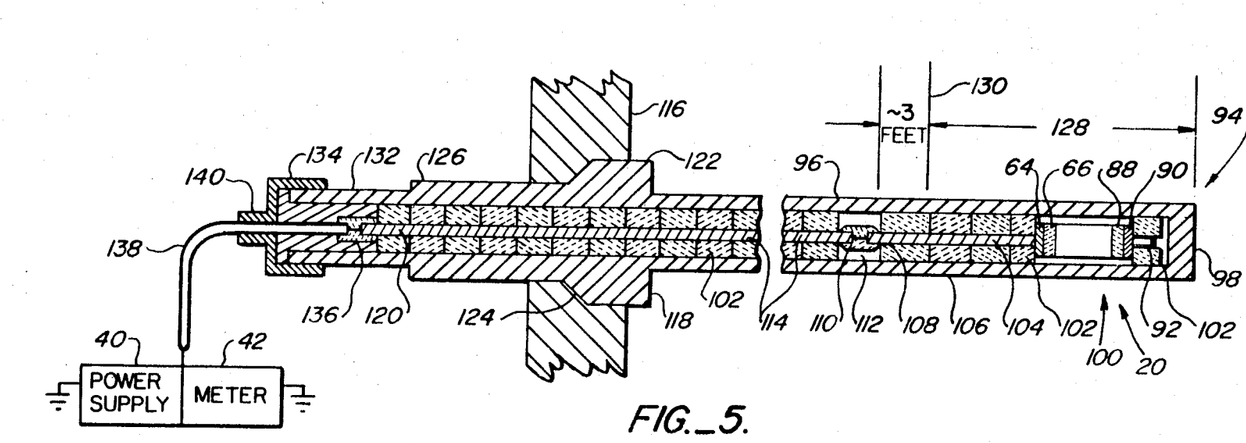
FIG. 5 shows an application of the detector of FIG. 4 according to a preferred embodiment of this invention.

FIG. 5 shows one application of the FIG. 4 detector 20 according to a preferred embodiment of this invention. FIG. 5 is a side cutaway view of the invention in which the inventive detector is disposed within a reactor core generating a neutron flux. The FIG. 5 detector assembly 94 includes a cylindrically shaped dry tube 96 (or wet tube equivalent) which is sealed and has a head 98.

A tube chamber 100 is provided for housing the detector 20 when placed into the neutron flux of the reactor core. Detector 20 is positioned with cap 92 close to head 98, followed by retaining ring 90, housing insulator 88, housing insulator 66, and retaining ring 64 of detector 20. To retaining ring 64 is attached upper cable 104 of the overall cable 62. Upper cable 104 is insulated from the wall 106 of dry tube 96 by being encased in annular assemblies of alumina insulation 102. Bottom end 108 of upper cable 104 is adapted to fit through ceramic seal 110 residing within dry tube 96. The gas between electrodes 32 and 34 pressurizes upper cable 104, having a length of approximately ten feet, all the way down to ceramic seal 110. A space 112 exists between upper cable 104 and a lower cable 114 (having a length of approximately thirty feet) of overall cable 62, which lower cable 114 is likewise insulated from wall 106 with insulation such as silica or alumina insulators 102.

Dry tube 96 is encircled by an integral boundary seal 118 which penetrates and is affixed to reactor wall 116. Boundary seal 118 is a conventional ASME pressure boundary seal typically used in nuclear reactors. Seal 118 is provided with a heat 122, which pinches down through neck 124 to a throat 126 of smaller external diameter than the outside diameter of head 122. The dry tube 96, stretching from its head 98 to the beginning of the boundary seal neck 124, comprises a tube to which the standard ASME pressure code applies.

Of particular importance to this invention is the location of this ceramic seal 110 with respect to the reactor core 128. Seal 110 is fabricated according to this invention from a ceramic material selected from the group including alumina, forsterite, beryllia and glass and preferably is comprised of alumina. One of the significant ways in which this invention solves problems of and improves over the prior art is by positioning ceramic seal 110 at a location experiencing a neutron flux which is at least two decades below the neutron flux in reactor core 128 experienced by detector 20. Even though detectors such as detector 20 were predicted to have a life of approximately 7 years, it was discovered that these detectors experienced a significant unexpected sensitivity change after use of approximately 2 years.

After extensive experimentation and investigation which led to the present invention, it was determined that one of the causes for detector sensitivity changes was fast neutron damage to the ceramic seal 110 due to neutron bombardment from the high flux in reactor 128 resulting in movement of gas between the sensor body and the cable, and therefore a sensitivity shift. Experimentation resulted in the inventive concept of relocating ceramic seal 110 from its previous location in the detector itself to a position shown in FIG. 5, which is approximately 2 feet below the bottom edge 130 of reactor core 128, and therefore well below the threshold for neutron damage. With this positioning, the neutron fluence at the end of the expected detector life will be approximately two decades below the threshold for fast neutron damage, which threshold is typically approximately 2 to $5 \times 10^{21}$ nvt.

Finally, dry tube 96 penetrates through boundary seal 118 to emerge at the dry tube's outside end 32, to be sealed by outside seal 134 designed to be post-LOCA qualified. Lower end 120 of lower cable 114 is hermetically sealed through ceramic lower connector 136 to be in electrically conducting relationship with external cable 138, which then penetrates through seal opening 140 for conventional electrical connection to power supply 40 and meter 42.

As is evident from viewing FIG. 5, this invention, by permanently emplacing detector 20 into reactor 128 for its anticipated life of from 4-6 years, eliminates the necessity found in the prior art of including equipment for inserting and retracting the sensors. Therefore, this invention eliminates the necessity for such prior art required apparatus as drive control electronics, a drive motor, flexible drive shaft, gearbox, and a vertical drive tube which contains the sensor 20 and provides a means for inserting it into the fixed dry tube 96. Additionally, the inventive sensor 20 can be qualified for both seismic and post loss-of-coolant accident conditions.

The cable insulation is silica in the form of microscopic spheres compacted to about 35% volume fraction. This compaction provides for very fast gas migration through the insulation thus enhancing detector manufacture and eliminating slow signal drifts that would result from use of normal mineral insulated cable such as the conventionally used alumina or magnesia.

By providing the proper balance between the gas volume and temperature within detector 20, and the gas volume and temperature within the 12 foot upper cable 104, gas movement between the detector and the upper cable that would occur after changes in reactor power will be minimized, and a linear sensor signal will be maintained. By backfilling dry tube 96 in the region measured from part 140 to part 98 with helium gas rather than air, the temperature of the anode in detector 20 can be significantly reduced down from a high of approximately 1186° F. to a reduced value of 976° F.

Tables I and II at the end of this Detailed Description show detector parameters. Table I is a description of the first development model of the proposed detector 20, which model operated successfully under test conditions. Shown in Table II is the revised detector which has been developed, and tested.

There has been concern in the field of neutron monitoring regarding the background signals produced by alpha particles which result from natural decay of U-234. This concern has translated into the production of fission counters having extremely small quantities of U-234, wherein a maximum of 0.5% U-234 is used in the prior art for some SRM fission counters. Thus, it is highly unlikely that the designers of such a fission counter would deliberately add U-234 in the quantities of this invention as required for a regenerative detector. However, with proper detector design and proper selection of electronics, it is relatively easy to discriminate between the spontaneous U-234 alpha signal resulting from spontaneous decay, versus the signal resulting from bombardment of the detector by the neutron flux in the reactor core. This permits the use of regenerative detectors in the lower ranges of neutron fluxes (i.e., the source range), in ranges from neutron fluxes of $10^3$ to approximately $10^9$ nv. Tests of the detector 20 according to this invention demonstrates that alpha discrimination is straightforward.

The wide range detector of this invention has more than enough sensitivity, in the range of approximately $0.64 \times 10^{-28}$ A$^2$/Hz/nv, for mean square voltage (MSV) operation. With conventional available electronics, it is easy to cover the full ten decade range of neutron flux required for a startup neutron flux monitoring device such as detector 20. Data demonstrating coverage of from $1.68 \times 10^3$ nv to $4 \times 10^{12}$ nv has been established. The ability to go to higher fluxes in the MSV mode is a function of the dynamic range of the electronics, which are designed by conventional techniques. Present day technology easily provides the capability to go to at least $1.50 \times 10^{13}$ nv.

The electronics, schematically exemplified in FIG. 5 by meter 42, receives the sensor 20 analog output signal traveling through external cable 138. This analog output signal is amplified in a pre-amplifier (not shown), and then separated by suitable electronic separating apparatus (not shown) into a counting channel and a mean square voltage (MSV) channel. This provides a measure of prompt neutron flux experienced by sensor over a ten decade range.

The electronic signal processing apparatus can, for example, take a variety of conventional forms. A first form could provide for separate signal processing, wherein the counting signal and the MSV signal are maintained as separate signals, and are fed into separate nuclear reactor control room indicators, recorders, and alarms (none of which are shown), and therefore readily interface with existing LWR control room equipment (not shown). A second form could provide for logarithmic signal processing, wherein the counting signal and MSV signal are converted into logarithmic signals for input into, for example, a selector circuit or auctioning circuit which selects the predominate signal for display on a Percent Power Meter; in such a system, a period trip circuit would be used as the primary safety trip. A third form could provide for combination signal processing, wherein various combinations of signal processing techniques require manual or automatic range switches in the MSV mode, with options for retrofit application to existing LWR fission plants, and for installation in new LWR plants.

Figures 6, 7:
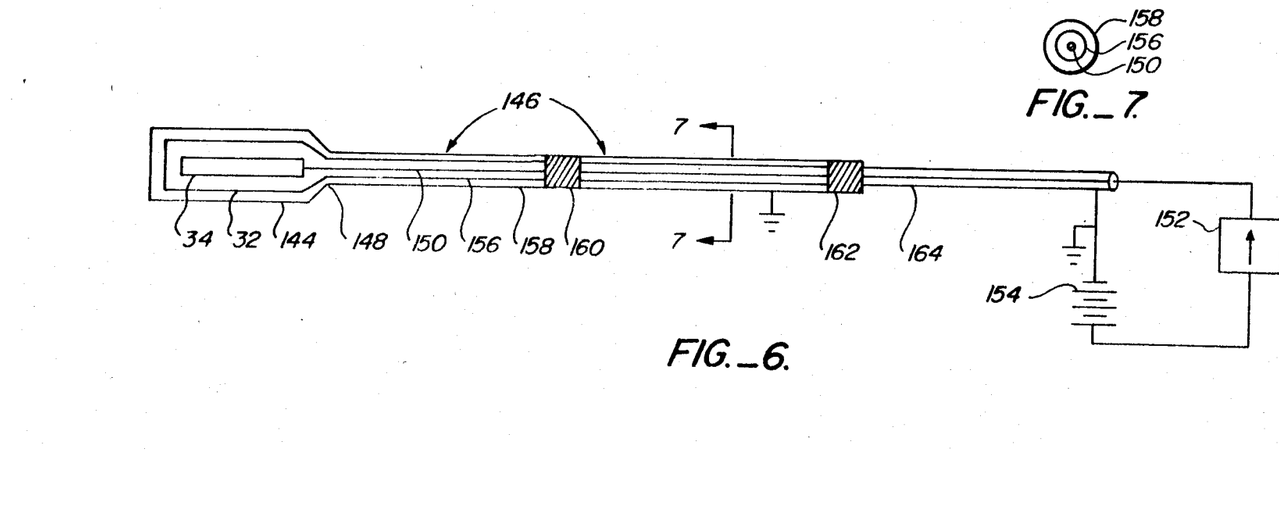
FIG. 6 shows a triaxial cable in combination with the schematically illustrated detector of this invention.
FIG. 7 is a cross section view of the triaxial cable of FIG. 6.

FIG. 6 shows that alternatively it is possible to construct a triaxial cable assembly, in which the outer sheath is in contact with reactor ground (not shown), and the inner sheath is isolated by the outer cable insulation and an insulating sleeve outside detector 20. According to this construction, sensor 20 is disposed within a metallic outer protective sheath 144. Sheath 144 is welded to triaxial cable 146 at weld 148.

In FIG. 6, interior wire 150 is electrically connected to electrode 34 at one end, and spans the distance from the sensor 20 to the exterior of the reactor vessel (not shown), to connect with a signal meter 152 and on to the positive anode of power supply 154. Surrounding interior wire 150 and electrically insulated from it is inner sheath 156, which also connects to sensor housing 32. Outside the reactor vessel, the opposite end of inner sheath 156 is electrically connected to the cathode of power supply 154. Likewise, outer sheath 158 is electrically insulated from but surrounds inner sheath 156 and sensor 20, and is electrically connected to reactor ground. A triaxial seal 160 is positioned below the reactor core in the same manner as ceramic seal 110 of FIG. 5. At the bottom of the reactor vessel, a second triaxial seal 162 provides a passage through which the triaxial cable can exit the reactor vessel. At this point, the triaxial cable 146 transitions into a coaxial cable 164 comprised of interior wire 150 and an outside housing which is electrically connected to the inner sheath 156 of the triaxial cable.

The dry tube type assembly, such as that shown in dry tube 96 of FIG. 5, can be readily adapted to a reactor core bottom entry removable system so that the detector 20 and its integral cable 62 are removed for replacement, while leaving dry tube 96 place. This will result in significant cost benefits to already existing operating plants, as well new plants constructed in the future. In order to minimize electromagnetic interference, the integral cable 62 used with sensor 20 will have a solid copper sheath housed inside a stainless steel outer sheath.

Calibration of detector 20 is not required for startup range sensors in the same manner as required for calibration of power range sensors. However, there is a need to periodically estimate the end of life of the detector 20, to provide assurance of replacement on a planned basis. This calibration can be accomplished by relating a DC signal from the inventive wide range sensor to TIP (Traversing Incore Probe) calibration information from adjacent LPRM's (Local Power Range Monitor).

The foregoing detailed description of the example preferred embodiments of the invention have been presented solely for purposes of illustration and description. This detailed description is not intended to be exhaustive, or to limit the invention to the precise form disclosed. Obviously, many modification and variations are possible in light of the above teaching. The example preferred embodiments were chosen and described in order to best explain the principles of the invention and the invention's practical application, to thereby enable others skilled in the art to best utilize the invention in various other embodiments not described above, and with various modifications as are suited to the particular use contemplated. It is intended that the scope of the invention be defined solely by the appended claims.

TABLE I
DETECTOR (FIRST DEVELOPMENT MODEL)

| | |
|---|---|
| Electrode spacing | 0.01 in. |
| Fill Pressure | 14.63 atmospheres (absolute) |
| Fill gas | Argon |
| Uranium Coating | 1.0 mg/cm$^2$ |
| Uranium mix | 21% U-235, 79% U-234 |
| Sensitive volume | Coated are - 0.49 in$^2$ |
| | Length - 1.00 in. |
| | Cathode diameter - .157 in. |
| INTEGRAL CABLE | |
| Insulation | Silica |
| Outer Sheath | 0.170 outer diameter × 0.015 wall, TP304 Stn. Stl. |
| Shield | 0.140 outer diameter × 0.015 wall, solid copper |
| Center wire | 0.021 outer diameter, grain stabilized copper |
| Impedance | 75 ohm |
| SENSOR CHARACTERISTICS | |
| *Neutron Sensitivity:* | |
| Counting | $0.55 \times 10^{-3}$ cps/nv |
| MSV | $1.28 \times 10^{-28}$ A$^2$/Hz/nv |
| DC | $1.14 \times 10^{-16}$ A/nv |
| Average charge per pulse | $1.88 \times 10^{-13}$ coulomb |
| *Gamma Sensitivity:* | |
| MSV | $1.86 \times 10^{-29}$ A$^2$/Hz/R/Hr |
| DC | $1.19 \times 10^{-13}$ A/R/Hr |
| *Alpha:* | |
| Counts | $0.367 \times 10^6$ cps |
| DC | $2.81 \times 10^{-9}$ Amps |
| MSV | $1.85 \times 10^{-23}$ A$^2$/Hz |
| Average charge per pulse | $7.65 \times 10^{-15}$ coulomb |
| *Collection Times:* | |
| Electron Collection Time | $6.0 \times 10^{-8}$ sec. |
| Ion Collection Time | $2.25 \times 10^{-5}$ sec. |

TABLE II
DETECTOR PROTOTYPE

| | |
|---|---|
| Electrode spacing | 0.01 in. |
| Fill Pressure | 14.63 atmospheres (absolute) |
| Fill gas | Argon |
| Uranium Coating | 0.6 mg/cm$^2$ |
| Uranium mix | 21% U-235, 79% U-234 |
| Sensitive volume | Coated area - 3.69 in$^2$ |
| | Length - 3.00 in. |
| | Cathode diameter - .392 in. |
| INTEGRAL CABLE | |
| Insulation | Silica |
| Outer Sheath | 0.170 outer diameter × 0.015 wall, TP304 Stn. Stl. |
| Shield | 0.140 outer diameter × 0.015 wall, solid copper |
| Center wire | 0.021 outer diameter, grain stabilized copper |
| Impedance | 75 ohm |
| SENSOR CHARACTERISTICS | |
| *Neutron Sensitivity:* | |
| Counting | $2.72 \times 10^{-3}$ cps/nv |
| MSV | $0.672 \times 10^{-28}$ A$^2$/Hz/nv |
| DC | $5.5 \times 10^{-16}$ A/nv |
| Average charge per pulse | $1.88 \times 10^{-13}$ coulomb |
| *Gamma Sensitivity:* | |
| MSV | $4.4 \times 10^{-28}$ A$^2$/Hz/R/Hr |
| DC | $1.3 \times 10^{-12}$ A/R/Hr |
| *Alpha:* | |
| Counts | $1.4 \times 10^6$ cps |
| DC | $1.04 \times 10^{-8}$ |
| MSV | $0.71 \times 10^{-22}$ A$^2$/Hz |
| Average charge per pulse | $7.65 \times 10^{-15}$ coulomb |
| *Collection Times:* | |
| Electron Collection Time | $6.0 \times 10^{-8}$ sec. @ 350 volts |
| Ion Collection Time | $2.25 \times 10^{-5}$ sec. @ 350 volts |

What is claimed is:

1. A wide range neutron detector, comprising:
   (a) a sealed chamber, having two spaced electrodes positioned therein, hermetically sealed with a seal which is disposed within a reactor vessel, adjacent the core of said reactor in an environment having neutron flux which is substantially at least two decades below the neutron flux at the location of the detector;
   (b) an ionizable gas, disposed within the space between the electrodes, pressurized to a pressure above six atmospheres; and
   (c) a layer of a mixture of an active material and a breeding material, positioned within the chamber, the active material and breeding material being respectively U-235 and U-234, the layer having a thickness of at least 0.2 milligrams per square centimeter.

2. The detector of claim 1, wherein the seal is comprised of a ceramic material brazed to a metallic material.

3. The detector of claim 1, wherein the detector is disposed within a nuclear reactor core having a neutron flux in the range of from $10^3$ to $10^{14}$ nv, with the detector so disposed that the seal is external to the reactor core and experiences a neutron flux which is at least two decades below the neutron flux in the reactor core.

4. The detector of claim 1, wherein the seal is positioned at least 24 inches outside the reactor core, to thereby diminish aging of the seal due to neutron bombardment, so the life of the seal is much greater than the life of the sensor.

5. the detector of claim 1, wherein the ionizable gas is pressurized to a pressure ranging from 6.0 atmospheres to 20.0 atmospheres.

6. The detector of claim 1, wherein the ionizable gas is pressurized to a pressure of 14.7 atmospheres.

7. The detector of claim 1, wherein the layer of the material has a thickness in the range of from 0.20 to 0.80 milligrams per square centimeter.

8. The detector of claim 1, wherein the layer has a thickness preferably in the range of from 0.40 to 0.80 milligrams per square centimeter.

9. The detector of claim 1, wherein the mixture of active and breeding material is comprised of a ratio ranging from 70:30 to 90:10 of a mixture of U-234:U-235.

10. The detector of claim 1, wherein the layer of the mixture of the active and breeding material is comprised of ratio of 21% U-235 to 79% U-234.

11. The detector of claim 1, wherein the space between the electrodes is in the range of from 0.008 to 0.020 inches.

12. The detector of claim 1, wherein the space between the electrodes is at least 0.010 inches.

13. The detector of claim 1, wherein the detector is designed to be sensitive to neutron fluxes in the range from $10^{-9}$% to 100% of the full power operation of the source providing the neutron flux.

14. The detector of claim 1, wherein one of the electrodes includes a layer of a mixture of active material and a breeding material.

15. The detector of claim 1, wherein each of the electrodes includes a layer of the mixture of an active material and a breeding material.

16. A method of measuring neutron flux over a wide range in a nuclear reactor having a containment vessel and reactor core, comprising the steps of:
  (a) sealing two spaced apart electrodes inside a chamber which includes a seal;
  (b) positioning and maintaining the chamber in the reactor core with the seal at at location adjacent to core within the vessel having a neutron flux which is at least two decades lower than the neutron flux experienced by the electrodes;
  (c) pressurizing an ionizable gas in the space between the electrodes to a pressure above six atmospheres; and
  (d) positioning a layer of a mixture of an active and a breeding material within the chamber, the active material and breeding material being respectively U-235 and U-234;
  (e) applying power across said electrodes; and,
  (f) measuring power across said electrodes from $10^3$ to $10^{14}$ nv.

17. The detector of claim 1, wherein the space is provided with a well controlled ionizable gas, selected to have a pressure high enough to provide, in conjunction with the selected layer of uranium coating, adequate sensitivity for the counting range.

18. The method of claim 16, wherein said pressurizing step includes pressurizing with a well controlled ionizable gas selected from the group of gases including argon and helium.

19. The method of claim 16, wherein said pressurizing step includes pressurizing a well controlled ionizable gas to a pressure of 14.7 atmospheres.

20. The detector of claim 19, wherein the sensitivity is in the range of $0.5 \times 10^{-3}$ cps/nv to $4.0 \times 10^{-3}$ cps/nv, and preferably is $2.5 \times 10^{-3}$ cps/nv.

21. The detector of claim 1, wherein at least one cable is disposed within the detector between the electrodes and the seal.

22. The detector of claim 1, wherein the cable insulation is in the form of microscopic spheres of silica compacted to approximately 35% volume fraction, this compaction providing for very fast gas migration through the cable, to thus eliminate the slow drifting in the detector signal which would result from use of normal mineral insulated cables such as alumina and magnesia.

23. The apparatus of claim 21, wherein the detector and integrally attached cables are substantially encased in insulators in the form of alumina cylinders.

24. The apparatus of claim 22, wherein the dry tube is backfilled with helium gas to permit lowering the detector anode temperature from approximately 1186° F. down to approximately 986° F.

25. The detector of claim 1, wherein the ratio of U-235 to U-234 is selected to provide a sensitivity versus neutron exposure relation which results in approximately a 60% reduction in sensitivity in five full power years.

26. The detector of claim 1, wherein the target sensitivity at the end of five full power years is selected to be $1 \times 10^{-3}$ counts per second/nv, such that an initial sensitivity of $2.5 \times 10^{-3}$ counts per second/nv is selected for the detector sensitivity.

27. The detector of claim 1, wherein the detector is designed to discriminate against any alpha signal emitted by the detector in the source range counting mode.

28. The detector of claim 1, wherein the detector is housed in a dry tube.

29. The detector of claim 1, wherein the detector is housed in a wet tube.

30. The detector of claim 1, wherein the detector and the cable are electrically isolated from reactor ground by means of coaxial ceramic insulators.

31. The detector of claim 1, wherein a triaxial assembly is provided in which an outer sheath is in contact with reactor ground, and an inner sheath is electrically isolated by the outer cable insulation and an insulating sleeve outside the detector 32. The apparatus of claim 21, wherein the cable contains a copper shield inside a stainless steel outer sheath, in order to minimize electromagnetic interference.

33. The detector of claim 1, wherein the detector is capable of measuring a neutron flux over a ten decade range.

34. The detector of claim 1, wherein the detector produces an output signal which is electrically separated to flow through a counting channel and a mean square voltage channel.

35. In combination with a nuclear reactor including a reactor core, a reactor vessel, a fixed site interior of said core for disposing a neutron sensor, cables running from said fixed site interior of said core to a location exterior of said pressure vessel, a power supply capable of delivering power exterior of said core, and a signal processor capable of analyzing electrical signals including current exterior of said core, the improvement of a wide range neutron detector connected across said cables comprising:
  (a) a sealed chamber, having first and second spaced electrodes positioned therein, disposed in said core having a neutron flux, with the first electrode connected to receive power from the power supply and the second electrode connected to deliver current to the signal processor through said cables, which chamber is hermetically sealed with a seal which is disposed exterior of said core within said vessel having a neutron flux which is substantially at least two decades below the neutron flux in the core location of the detector;

(b) an ionizable gas, disposed within the space between the electrodes, pressurized to a pressure above one atmosphere; and (c) a layer of a mixture of an active material and a breeding material, positioned within the chamber, the active material and the breeding material being respectively U-235 and U-234, the layer having a thickness of at least 0.2 milligrams per square centimeter, which active material when struck by the neutron flux is capable of ionizing the gas to cause conduction of electric current from the first electrode through the second electrode to the signal processor, which current is proportional to the intensity of the neutron flux.

36. The detector of claim 1, wherein the detector and the cable are electrically connected to reactor ground.

* * * * *